US008561961B1

(12) United States Patent
Blessitt et al.

(10) Patent No.: US 8,561,961 B1
(45) Date of Patent: Oct. 22, 2013

(54) CAPTIVE HARDWARE FOR IMPROVED INSTALLATION

(75) Inventors: James Blessitt, Peachtree City, GA (US); Troy Winslett, Fairburn, GA (US)

(73) Assignee: Cooper Technologies Company, Houston, TX (US)

(*) Notice: Subject to any disclaimer, the term of this patent is extended or adjusted under 35 U.S.C. 154(b) by 294 days.

(21) Appl. No.: 13/034,951

(22) Filed: Feb. 25, 2011

Related U.S. Application Data

(60) Provisional application No. 61/308,128, filed on Feb. 25, 2010.

(51) Int. Cl.
*F16M 13/00* (2006.01)

(52) U.S. Cl.
USPC ........ 248/547; 248/217.4; 411/103; 411/104; 411/134

(58) Field of Classification Search
USPC .............. 248/547, 71, 216.1, 217.4; 411/103, 411/104, 111, 113, 134, 999
See application file for complete search history.

(56) References Cited

U.S. PATENT DOCUMENTS 2,222,449 A * 11/1940 Tinnerman .................... 411/172
2,226,168 A * 12/1940 Kass ............................ 248/547
2,316,389 A 4/1943 Atkinson
2,557,147 A * 6/1951 Schatzman ................... 280/848
2,984,442 A * 5/1961 Lawson ........................ 248/547
3,060,988 A * 10/1962 Munse .......................... 411/103
3,107,076 A * 10/1963 Rosselet ......................... 248/71
3,290,109 A * 12/1966 Vanegas ........................ 312/326
3,434,103 A * 3/1969 Hancock et al. .............. 439/812
3,479,071 A * 11/1969 Downing ...................... 403/384
3,597,889 A 8/1971 LoNigro
3,704,739 A * 12/1972 Holton .......................... 411/103
4,219,064 A * 8/1980 Lozano ......................... 411/103
4,260,123 A * 4/1981 Ismert .......................... 248/74.1
4,270,591 A * 6/1981 Gill et al. ...................... 411/112
4,479,607 A * 10/1984 Okumura et al. ............. 238/349
4,557,651 A * 12/1985 Peterson ....................... 411/181
4,972,339 A 11/1990 Gabrius
5,012,043 A * 4/1991 Seymour ......................... 174/57
5,029,794 A 7/1991 Wolfe
5,057,979 A 10/1991 Carson et al.
5,059,075 A * 10/1991 Kelly ............................ 411/107
5,178,503 A 1/1993 Losada
5,379,199 A 1/1995 Hirshenhorn et al.
5,449,139 A * 9/1995 Herelier et al. ............... 248/300
5,505,419 A 4/1996 Gabrius
5,588,737 A 12/1996 Kusmer
5,634,756 A * 6/1997 Losada ......................... 411/441
5,690,423 A 11/1997 Hentz et al.

(Continued)

*Primary Examiner* — Bradley Duckworth
(74) *Attorney, Agent, or Firm* — King & Spalding LLP

(57) ABSTRACT

A lighting fixture includes a housing with an upper base panel and opposed end walls that collectively define an opening in which one or more lamps and one or more reflector panels are disposed. The lamps extend substantially along a longitudinal axis of the housing, between bracket subassemblies. Each bracket subassembly includes at least one captive hardware fastener, which is pre-installed in the bracket subassembly and designed to be movable relative to the bracket subassembly only upon application of deliberate force with respect to the captive hardware fastener. While the captive hardware fastener is movable for installation purposes, the captive hardware fastener is not readily removable from its corresponding bracket subassembly. For example, the captive hardware can include a self-drilling screw, the body of which extends between two substantially parallel members separated by a third member, which has a straight or curved geometry.

14 Claims, 12 Drawing Sheets

(56) References Cited

U.S. PATENT DOCUMENTS

| | | | | |
|---|---|---|---|---|
| 6,004,011 | A | 12/1999 | Sieczkowski | |
| 6,076,788 | A | 6/2000 | Akiyama | |
| 6,146,071 | A * | 11/2000 | Norkus et al. | 411/104 |
| 6,174,119 | B1 * | 1/2001 | Orr | 411/461 |
| 6,272,794 | B1 | 8/2001 | Rippel et al. | |
| 6,715,720 | B2 * | 4/2004 | Finn | 248/71 |
| 6,854,941 | B2 * | 2/2005 | Csik | 411/112 |
| 7,226,032 | B2 * | 6/2007 | Schlais et al. | 248/547 |
| 7,673,841 | B2 | 3/2010 | Wronski | |
| 7,735,795 | B2 * | 6/2010 | Wronski | 248/343 |
| 7,874,539 | B2 * | 1/2011 | Wright et al. | 248/547 |
| 8,177,176 | B2 * | 5/2012 | Nguyen et al. | 248/200.1 |
| 8,240,630 | B2 * | 8/2012 | Wronski | 248/343 |
| 2005/0247842 | A1 | 11/2005 | Wronski | |
| 2007/0075206 | A1 | 4/2007 | Wright et al. | |
| 2008/0310931 | A1 * | 12/2008 | Csik et al. | 411/103 |
| 2012/0292475 | A1 * | 11/2012 | Wronski | 248/323 |

* cited by examiner

CAPTIVE HARDWARE FOR IMPROVED INSTALLATION

RELATED APPLICATION

This application claims priority under 35 U.S.C. §119 to U.S. Provisional Patent Application No. 61/308,128, titled "Features for Improving Installation and Retrofitting of Certain Lighting Fixtures," filed on Feb. 25, 2010, the complete disclosure of which is hereby fully incorporated herein by reference.

TECHNICAL FIELD

This disclosure relates generally to captive hardware and, more particularly, to captive hardware for installation or retrofitting of recessed lighting fixtures.

BACKGROUND OF THE INVENTION

A luminaire is a system for producing, controlling, and/or distributing light for illumination. For example, a luminaire can include a system that outputs or distributes light into an environment, thereby allowing certain items in that environment to be visible. Luminaires are often referred to as "light fixtures."

Recent technologies relative to ballasts and light sources are more energy efficient than those used in the past. However, the expense of replacing an entire light fixture previously installed may make taking advantage of such improvements in these technologies cost prohibitive. Recently, efforts have been made to retrofit previously installed light fixtures to provide a less expensive way to take advantage of new lighting technology.

Light fixture retrofitting is the practice of replacing or eliminating components in an existing light fixture housing to make the light fixture more energy efficient or change some other performance characteristic of the light fixture. However, the larger the cost of replacement components and longer the installation of a retrofit solution takes, the less likely that retrofit solution will make economic sense for the owner of the previously installed light fixture.

Many current retrofitting solutions are relatively crude in design, often requiring lengthy and complex installation with loose parts, which may add to the installer's difficulty since many of the light fixtures being retrofitted are recessed in a ceiling. Wiring the previously installed fixture is often a difficult task and, sometimes, a hazardous one that could affect the safety of the installer, especially when the fixtures are at high elevation or difficult to reach. Essentially, the pre-existing housing is an upside down box where any installation of a new component into that upside down box brings with it the risk of falling objects. This creates a safety hazard not only for the installer but other individuals in the installation area. Moreover, the more cumbersome the installation, the longer the installation may take and the greater the number of installers needed to complete the installations. Such delay and/or additional installers only add to the expense of retrofitting existing lighting fixtures

SUMMARY

A recessed light fixture generally includes a housing mounted in a ceiling plane. The housing includes an upper base panel and opposed end walls extending generally downward from the upper base panel. A kit for retrofitting the recessed light fixture can include a first bracket configured to be coupled to the housing adjacent one end wall. The first bracket can include a first electrical socket. A second bracket can be configured to be coupled to the housing, adjacent the opposing end wall. The second bracket can include a second electrical socket, with the first and second electrical sockets completing a circuit with a lamp when the lamp is installed between the first and second electrical sockets.

Each bracket can include at least one captive hardware feature designed to couple at least a portion of the bracket to the housing. Each captive hardware feature can include a first member including a first aperture, which defines a pathway through the first member, and a second member disposed on a substantially parallel plane as the first member. The second member can include a second aperture, which defines a pathway through the second member. A third member can be coupled at one point to the first member and at a second point to the second member and extends substantially between the first member and the second member. A fastener can be preinstalled in the bracket, extending at least partially through each of the first aperture and the second aperture. The fastener can be held in a substantially fixed position relative to the first member and the second member unless and until a deliberate, positive force is applied with respect to the fastener.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the claimed invention and the advantages thereof, reference is now made to the following description, in conjunction with the accompanying figures briefly described as follows.

FIG. 2, including

DETAILED DESCRIPTION OF THE EXEMPLARY EMBODIMENTS

Exemplary embodiments of the claimed invention are directed to captive hardware positioned in members and devices for improved installation. In certain exemplary embodiments, a linear lighting fixture includes a housing, which includes an upper base panel and opposed end walls extending generally downward from the upper base panel. The upper base panel and opposed end walls define an opening in which one or more lamps and one or more reflector panels are disposed. The lamps extend substantially along a longitudinal axis of the housing, between bracket subassemblies, which extend substantially perpendicular to the lamps.

Each bracket subassembly includes a captive hardware fastener, which is pre-installed in the bracket subassembly and designed to be movable relative to the bracket subassembly only upon application of deliberate force with respect to the captive hardware fastener. While the captive hardware fastener is movable for installation purposes, the captive hardware fastener is not readily removable from its corresponding bracket subassembly. Using captive hardware fasteners reduces the number of free hands needed to complete the installation of a part, reduces the risk of losing fasteners, and reduces the need to pick up dropped fasteners as an additional delay to a successful installation.

Figure 1:
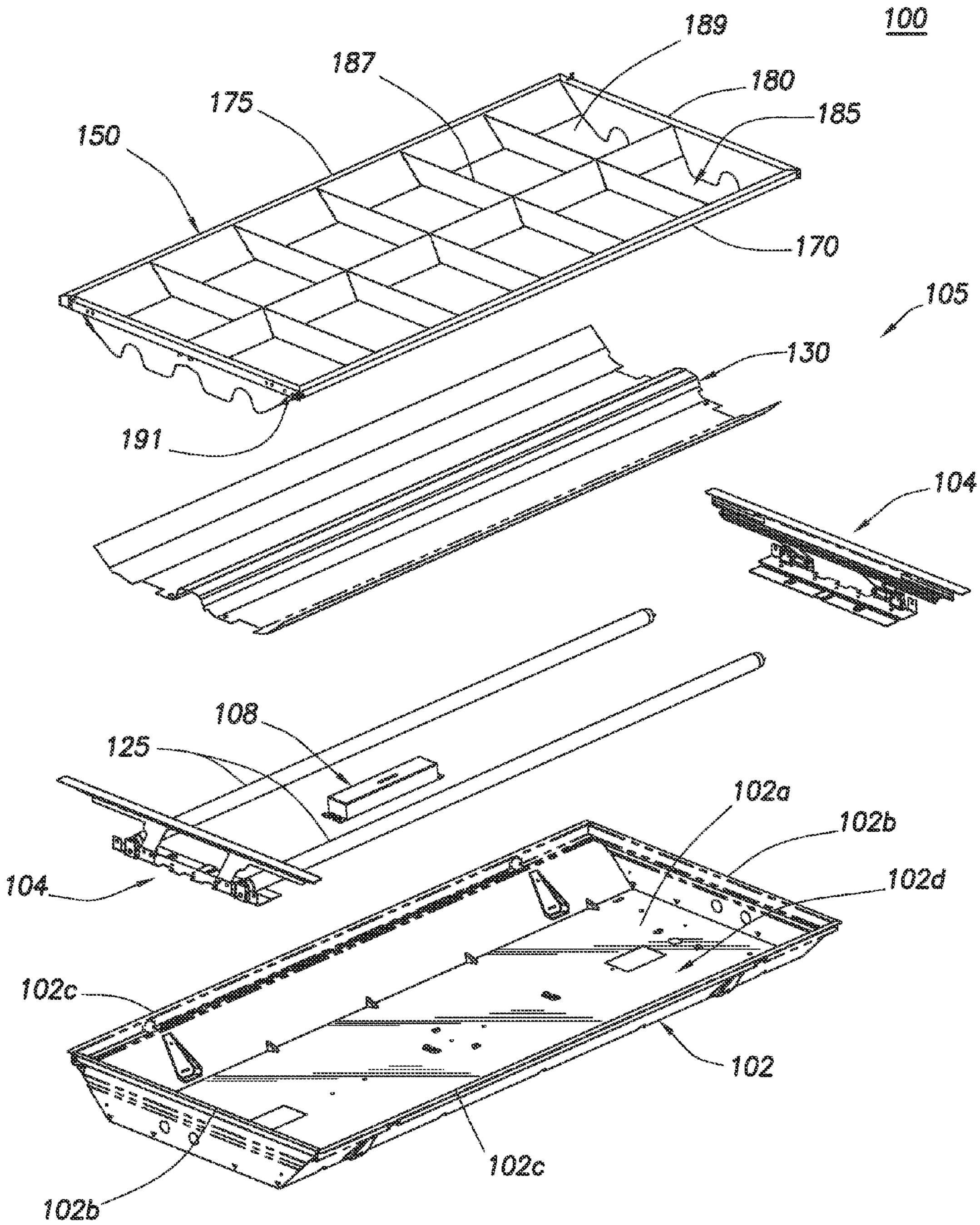
FIG. 1 is an exploded view of a top-level assembly of a retrofit linear lighting fixture, in accordance with certain exemplary embodiments.
Figure 2A:
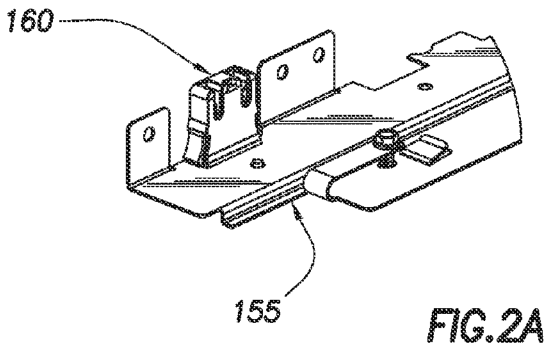
FIGS. 2A and 2B, is an exploded view of certain components of a retrofit kit for the retrofit linear lighting fixture of FIG. 1, in accordance with certain exemplary embodiments.
Figure 3:
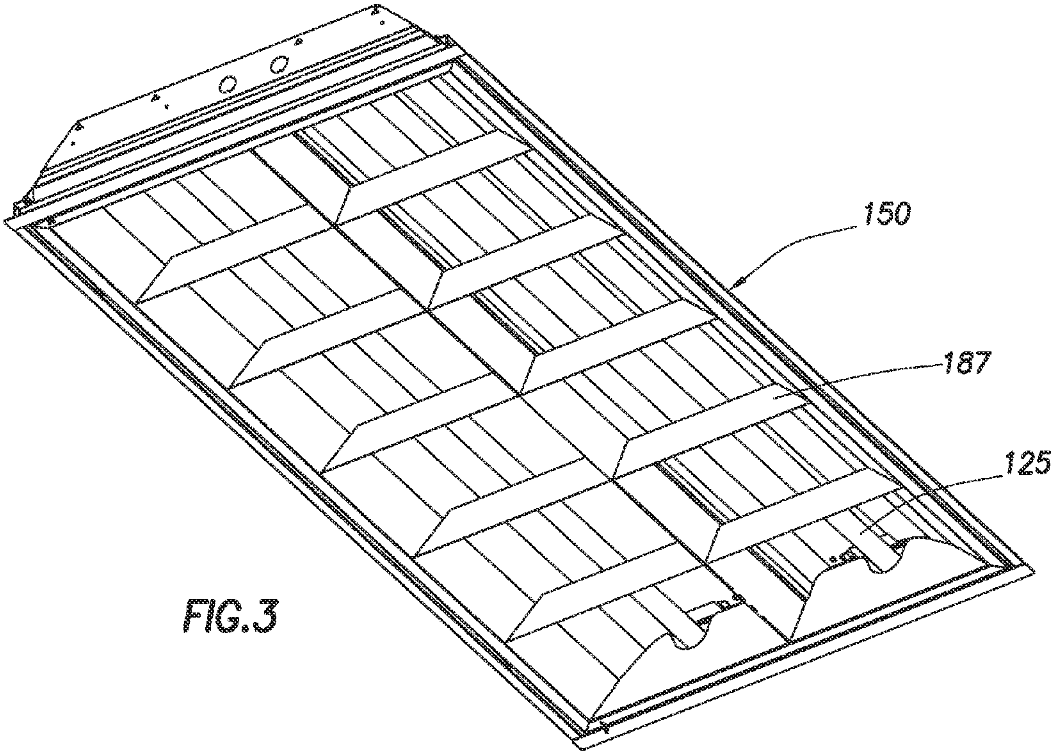
FIG. 3 is a perspective view of the reftrofit linear lighting fixture of FIG. 1, in accordance with certain exemplary embodiments.
Figure 2B:
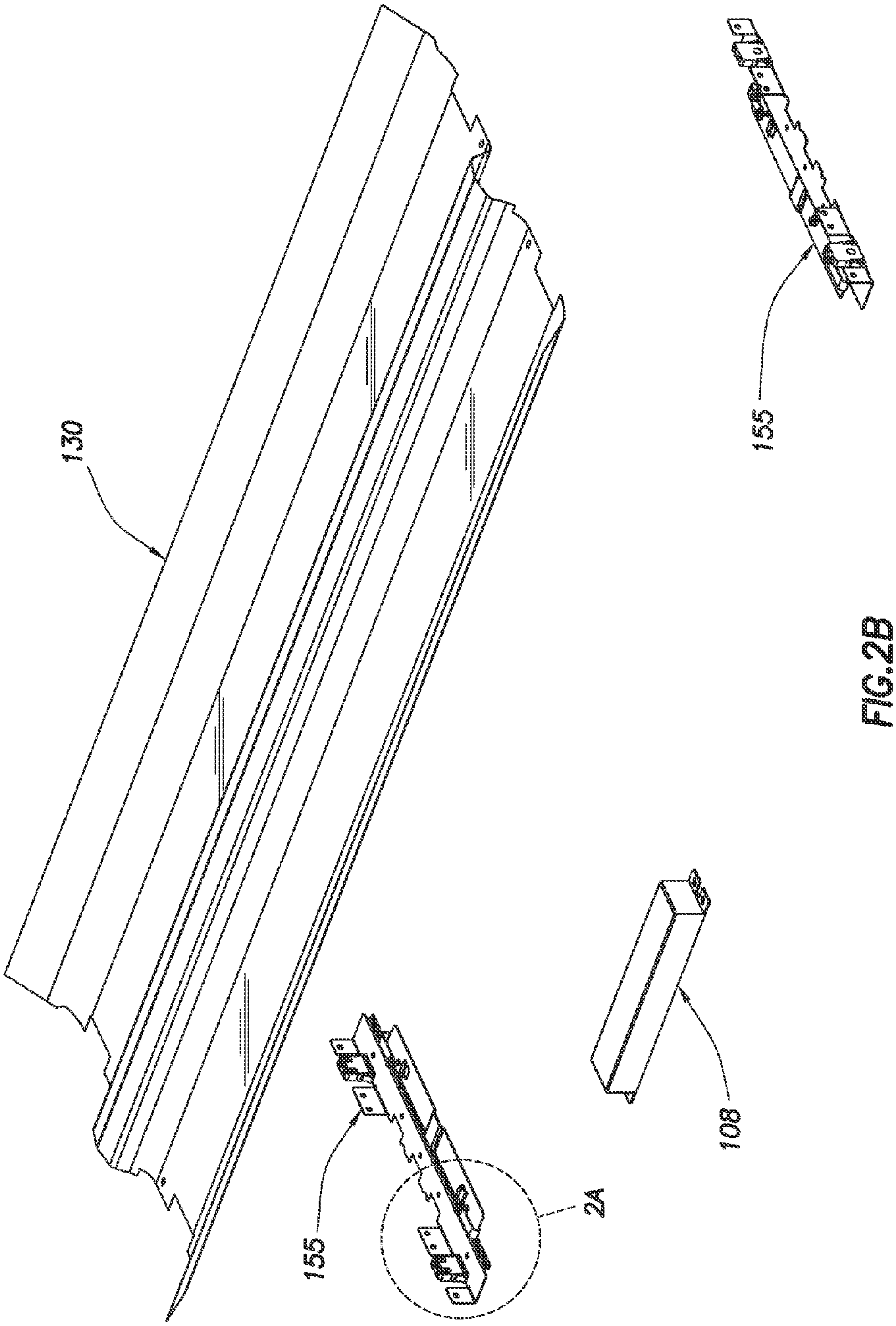

Turning now to the drawings, in which like numerals indicate like elements throughout the figures, exemplary embodiments are described in detail. As would be recognized by a person of ordinary skill having the benefit of the present disclosure, the claimed invention may be embodied in many different forms and should not be construed as limited to the exemplary embodiments depicted and described herein. FIG. 1 is an exploded view of a top-level assembly of a retrofit linear lighting fixture 100, in accordance with certain exemplary embodiments. As shown in FIG. 1, an existing luminaire housing 102 is retrofitted with an exemplary retrofit kit 105. FIG. 2, including FIGS. 2A and 2B, is an exploded view of certain components of the retrofit kit 105, in accordance with certain exemplary embodiments. FIG. 3 is a perspective view of the assembled linear lighting fixture 100, in accordance with certain exemplary embodiments. Although FIGS. 1-3 are described herein with respect to retrofitting of the existing luminaire housing 102, a person of ordinary skill in the art will recognize that the components of FIGS. 1-3 also can be used in a non-retrofit (i.e., an original) installation of a light fixture. Therefore, the disclosure herein should be understood to apply equally to retrofit and original installations of light fixtures.

The existing luminaire housing 102 includes an upper base panel 102*a*, opposing end walls 102*b* and opposing side walls 102*c*. Side walls 102*c* extend along a longest length of the housing 102. End walls 102*b* extend substantially perpendicular to side walls 102*c*. The upper base panel 102*a* and walls 102*b* and 102*c* define an interior region 102*d* in which certain other components of the fixture 100, including at least one lamp 125 and at least one reflector 130 are disposed.

In certain exemplary embodiments, a door 150 substantially covers the interior region 102*d*. The door 150 includes a substantially elongated, substantially rectangular frame 170, which includes opposing side rails 175 extending along a longest length of the door 150, and opposing end members 180 extending substantially perpendicular to the side rails 175. The side rails 175 and end members 180 define an opening 185 in which louvers 187 segment the opening 185 into multiple different opening areas 189. The louvers 187 direct light from the lamp(s) 125 through the opening areas 189 into an environment associated with the lighting fixture 100. In certain alternative exemplary embodiments, in addition to, or in lieu of, the louvers 187, the lighting fixture 100 may include one or more lenses, which include an optically transmissive or clear, refractive or non-refractive material (not shown) that provides environmental protection for the lamps 125 and other internal components of the fixture 100 while also transmitting light emitted by the lamps 125 into the environment.

Although the exemplary embodiment is depicted in the figures as having a substantially rectangular-shaped geometry, alternative embodiments of the fixture 100 have any of a number of different shapes, including, without limitation, a square shape and a frusto-conical shape. For example, in certain exemplary embodiments, one or more of the end walls 102*b* and side walls 102*c* can be angled outward or inward relative to the upper base panel 102*a*. The housing 105 also is capable of being configured in a number of different sizes. In certain exemplary embodiments, the housing 105 is about two feet wide by four feet long. In other exemplary embodiments, the housing 105 is about two feet wide by two feet long. A person of ordinary skill in the art having the benefit of the present disclosure will recognize that these sizes are merely exemplary, and the housing 105 can have any other size in alternative exemplary embodiments. The housing 105 is configured to be suspended from, or recessed within, a ceiling or other surface (not shown).

Bracket subassemblies 104 are coupled to the housing 105, substantially adjacent the end walls 102*b*. As best seen in FIG. 2, each bracket subassembly 104 includes a socket holder 155, which rests on and is coupled to the upper base panel 102*a*, as described below in connection with FIGS. 6 and 7. The socket holder 155 includes one or more sockets 160, which are coupled to or integrated in the socket holder 155 and are each configured to electrically couple with an end of a lamp 125, for providing power to the lamp 125. For example, power may be provided to the sockets 160 (and from the sockets 160 to the lamp 125) via a ballast 108, driver, or other power source (not shown) associated with the fixture 100.

A person of ordinary skill in the art will recognize that the numbers and types of light sources may vary in certain alternative exemplary embodiments. For example, instead of fluorescent lamps 125, the fixture 100 may include linear light emitting diode ("LED") light sources. Therefore, the description herein of lamps, sockets, and ballasts should be understood to include both fluorescent and non-fluorescent lamps and corresponding power components, which may include a ballast 108, LED driver, and/or other component.

Figure 4:
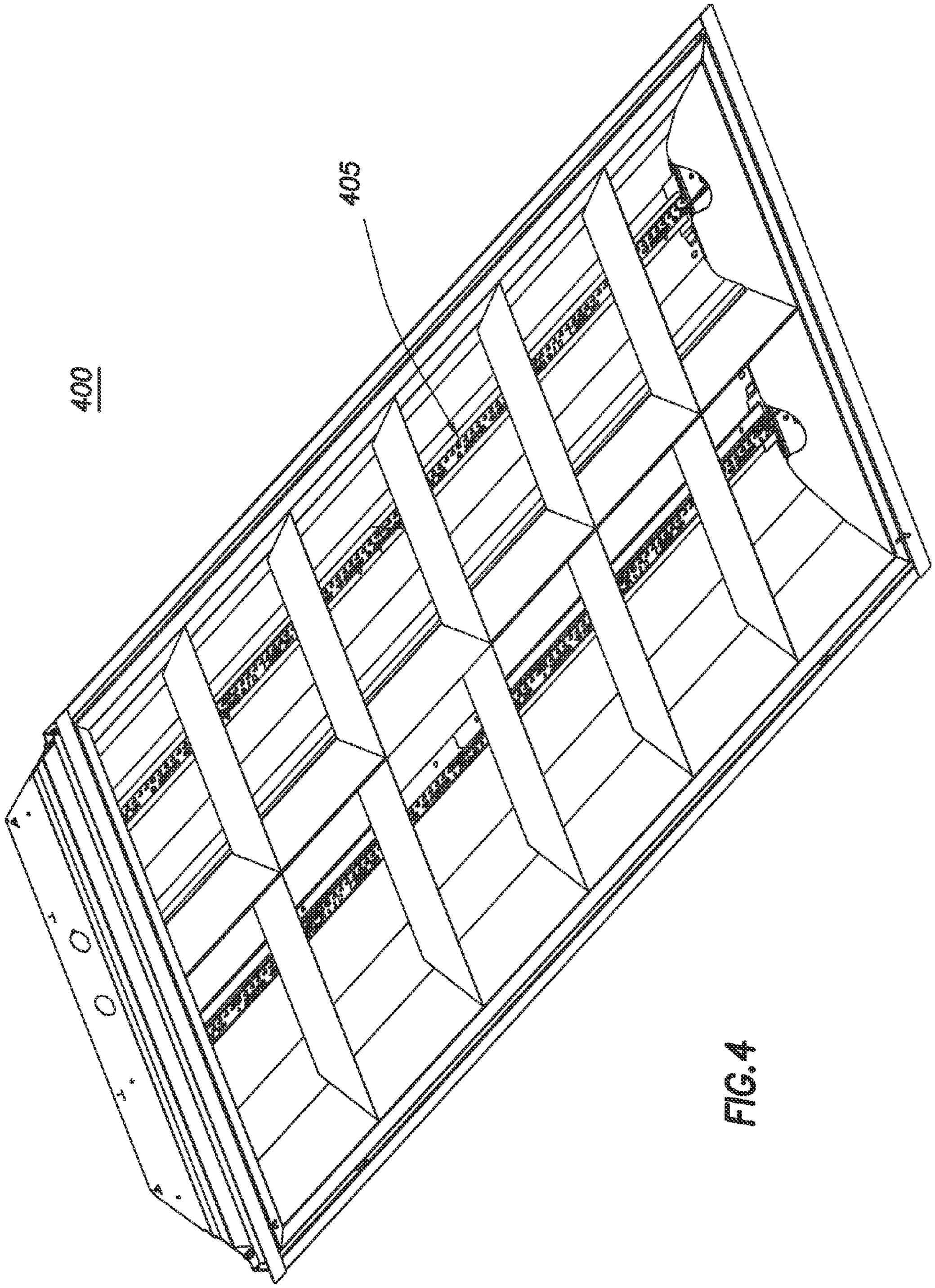
FIG. 4 is a perspective view of the reftrofit linear lighting fixture of FIG. 1, in accordance with certain alternative exemplary embodiments.

FIG. 4 is a perspective view of a reftrofit linear lighting fixture 400, which is substantially similar to the fixture 100 of FIGS. 1-3 except that the light source includes one or more strips of LEDs 405. The term "strip" is used herein to refer to an arrangement or a configuration whereby one or more LEDs are disposed approximately in or along a line. LEDs in a strip 405 are not necessarily in perfect alignment with one another. For example, one or more LEDs in a strip 405 might be slightly out of perfect alignment due to manufacturing tolerances or assembly deviations. In addition, LEDs in a strip might be purposely staggered in a non-linear arrangement or presented in some other type of array format. Each strip 405 extends along the longitudinal axis of the housing 102 and is coupled to the upper base panel 102*a*. For example, each strip 405 can be attached to the upper base panel 102*a* by a solder joint, a plug, an epoxy or bonding line, or another suitable provision for mounting an electrical/optical device on a surface. A person of ordinary skill in the art will recognize that other linear or non-linear configurations of the LEDs may be provided in certain alternative exemplary embodiments.

Figure 5:
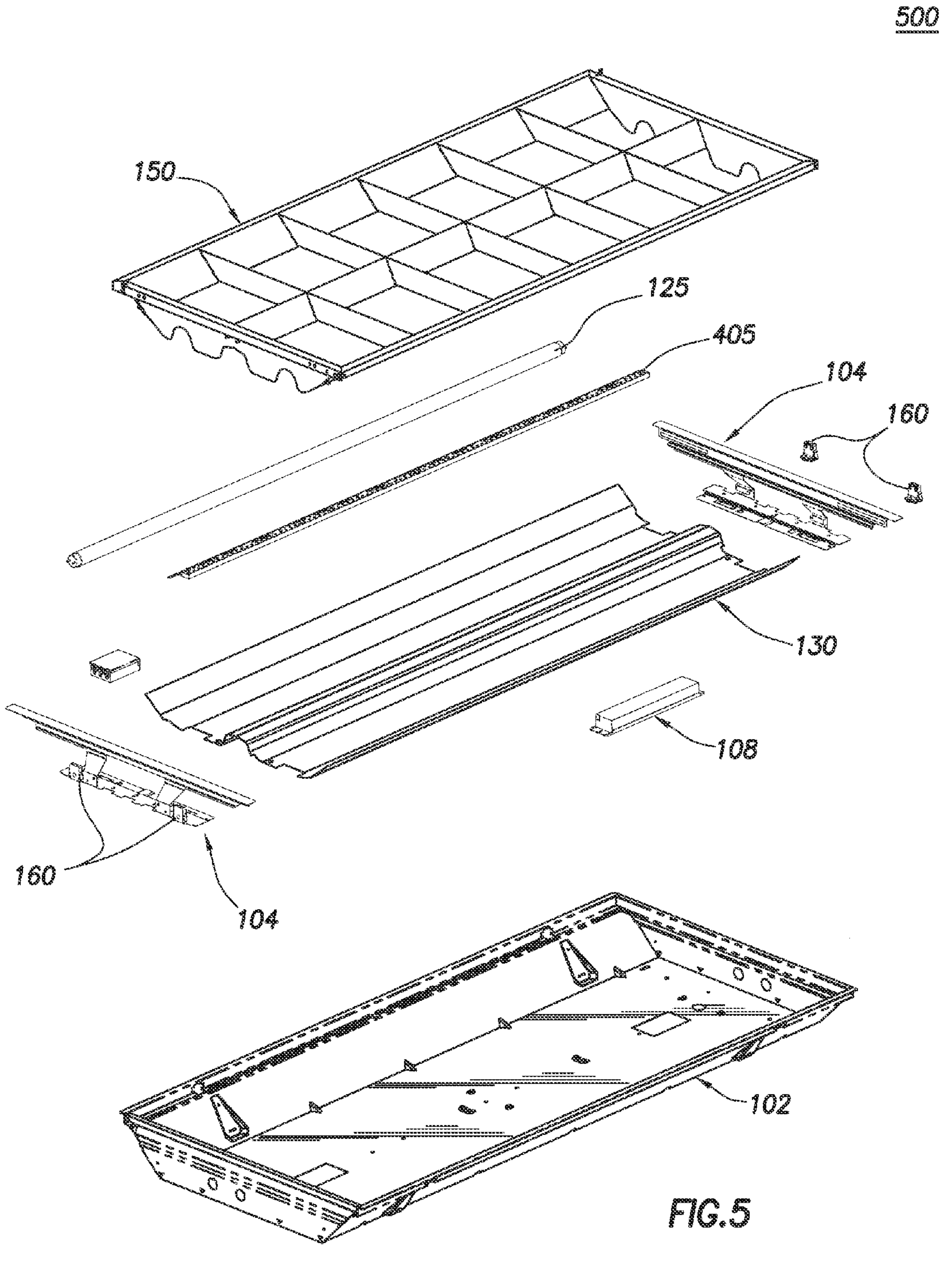
FIG. 5 is an exploded view of a top-level assembly of a retrofit linear lighting fixture, in accordance with certain additional alternative exemplary embodiments FIG. 6, including

FIG. 5 is an exploded view of a top-level assembly of a retrofit linear lighting fixture 500, in accordance with certain alternative exemplary embodiments. The fixture 500 is similar to each of the fixtures 100 and 400 described above except that the fixture 500 includes either a fluorescent light source 125 or an LED light source 405 or both. Thus, the light fixture 500 can provide a single type of light source or a combination of different light sources in a single fixture. Although depicted as including only a single ballast 108, a person of ordinary skill in the art will recognize that the fixture 500 may include a ballast 108, a driver, or some combination thereof to provide power control for the lamp 125 and LED 405. Although each socket holder 155 includes two sockets 160, the fixture 500 only utilizes one set of the sockets 160. Therefore, the number of sockets 160 actually used in operation may vary from the number of available sockets 160, depending on the desired configuration of the light fixture 500.

Returning now to FIGS. 1 and 2, the reflector 130 extends between the lamps 125 (and/or LED strips 405) and the upper base panel 102*a* of the housing 102 and reflects light from the lamps 125 (and/or LED strips 405) towards a bottom end of the housing 105 (away from the upper base panel 102*a*). The reflected, indirect light from the lamps 125 (and/or LED strips 405) is emitted through the bottom end of the housing 102, into a desired environment. In the exemplary embodiment depicted in the figures, the fixture 100 includes a single reflector panel 130, which is coupled to the upper base panel 102*a*, the socket holders 155, and/or the end walls 102*b* via one or more fasteners (not shown). A person of ordinary skill in the art will recognize that the number, size, and shape of the reflector panel 130 can vary in alternative exemplary embodiments, depending on the desired light output from the fixture 100. For example, in certain alternative exemplary embodiments, the single reflector panel 130 may be replaced with multiple different reflector panels, such as one reflector panel per lamp 125.

Figure 6A:
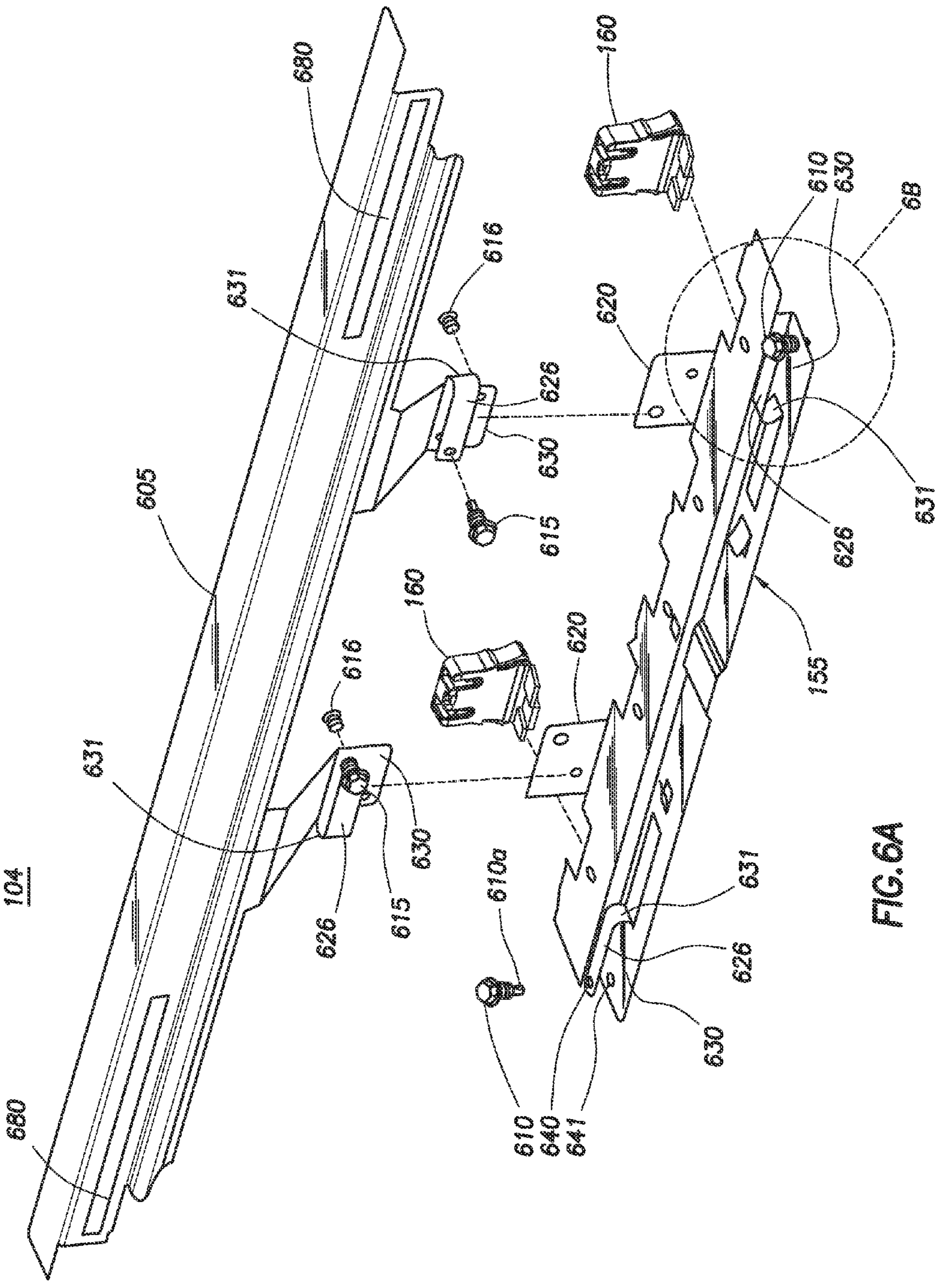
FIGS. 6A and 6B, is an exploded view of a bracket subassembly of the retrofit linear lighting fixtures of FIGS. 1, 4, and 5 in accordance with certain exemplary embodiments.
Figure 6B:
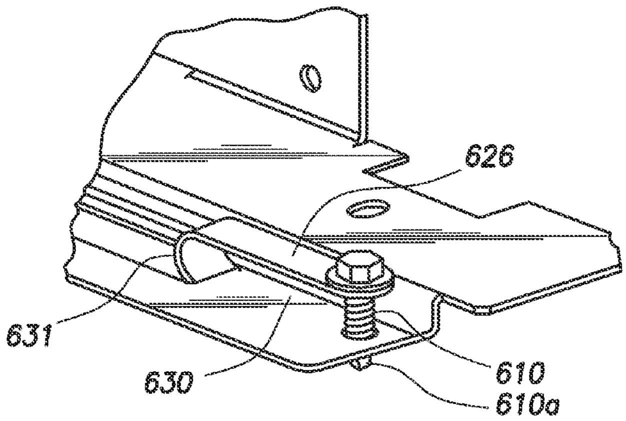
Figure 7:
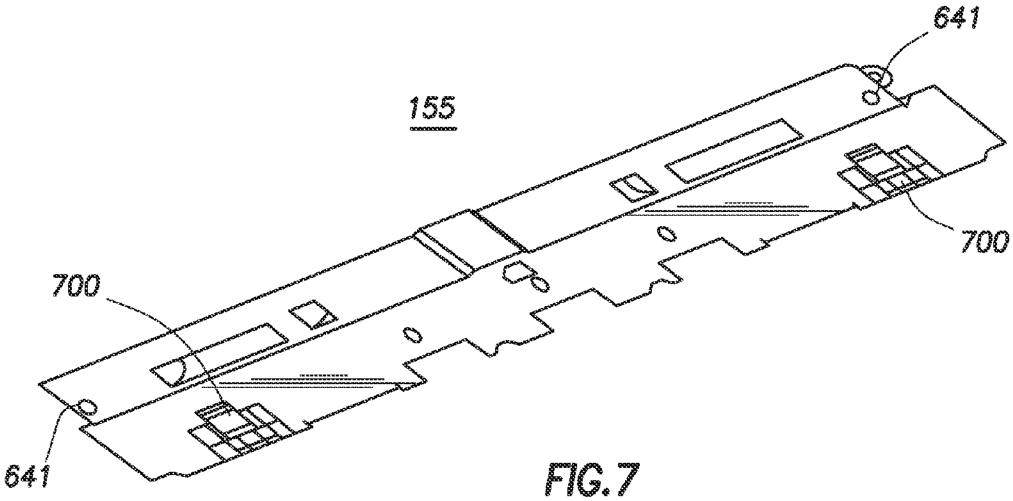
FIG. 7 is a perspective view of a bottom of a socket holder of the bracket subassembly of FIG. 6, in accordance with certain exemplary embodiments.

FIG. 6, including FIGS. 6A and 6B, is an exploded view of a bracket subassembly 104 of the retrofit linear lighting fixtures 100, 400, and 500 of FIGS. 1, 4, and 5, respectively, in accordance with certain exemplary embodiments. FIG. 7 is a perspective view of a bottom of the socket holder 155 of the bracket subassembly 104 of FIG. 6, in accordance with certain exemplary embodiments. With reference to FIGS. 1-3 and 6-7, each bracket subassembly 104 includes the socket holder 155 and a door bracket 605. The socket holder 155 includes a substantially elongated member, which extends substantially perpendicular to the lamps 125, substantially adjacent the end walls 102*b*. As best seen in FIG. 7, a bottom side of the socket holder 155 includes one or more tabs 700, openings, or other features, which couple sockets 160 to the socket holder 155. For example, each socket 160 can "snap" into the features in the socket holder 155 to become coupled thereto. The socket holder 155 rests on and is coupled to the upper base panel 102*a* via one or more fasteners 610. In certain exemplary embodiments, the fasteners 610 include a captive screw, as described below.

A door bracket 605 is coupled to the socket holder 155 and/or an end wall 102*b* of the housing 102 via one or more fasteners 615 and 616, which extend through protruding members 620 of the socket holder 155. The protruding members 620 extend substantially perpendicular to the longitudinal axis of the socket holder 155. Each member 620 rests behind its corresponding member 630, between the member 630 and the housing end 102*b*. The fastener 615 extends through an aperture in the member 626 and another aperture in the member 630 (as illustrated in FIG. 6B) and into the housing end 102*b*. In certain alternative exemplary embodiments, the member 620 extends between members 630 and 626. In certain exemplary embodiments, the fasters 615 and 616 include a captive screw or a rivet. A person of ordinary skill in the art will recognize that other fastening means may be used in place of the captive screws 610 and 615 and the rivets 616 in certain alternative exemplary embodiments. For example, the fasteners may include solder, braze, welds, rivets, glue, epoxy, clamps, screws, nails, and/or other fastening means known to a person of ordinary skill in the art having the benefit of the present disclosure. The door bracket 605 is configured to couple the door 150 to the housing 102. For example, one or more latches 191 of the door 150 may slide within one or more corresponding slots 680 in the door bracket 605 to couple the door 150 to the door bracket 605.

Each captive hardware fastener 610/615 is pre-installed in its respective portion of the bracket subassembly 104 and is movable relative to the bracket subassembly 104 only upon application of deliberate force with respect to the captive hardware fastener 610/615. While the captive hardware fastener 610/615 is movable for installation purposes, the captive hardware fastener 610/615 is not readily removable from its corresponding bracket subassembly 104. Installation of luminaires and other mechanical devices in general and retrofit kits in particular often requires the use of screws to hold the mechanical device in place. When a person has to hold the mechanical device in place as well as hold the screw and the screw-driver or drill it can force the user to either seek assistance or attempt to contort their body in a way to hold all three things in place at once. Providing captive mounting fasteners, such as captive hardware fasteners 610/615 with a retrofit (or installation) kit, such as kit 105, or in any other mechanical device requiring the use of a screw allows for a safer, less stressful installation, especially if the user is attempting to complete the installation on a luminaire overhead while balancing on a ladder. Captive mounting fasteners also eliminates or reduces the need to include hardware bag kits with the mechanical device in general and the retrofit kit 105 in certain exemplary embodiments.

In FIG. 6A, one of the captive screws 615 is installed in the door bracket 605, and one of the captive screws 615 is shown removed from the door bracket 605. Similarly, in FIG. 6A, one of the captive screws 610 is installed in the socket holder 155, and one of the captive screws 610 is shown removed from the socket holder 155. In each instance, the captive hardware fastener includes a captive member 626, a positioning member 630, and an attachment member 631.

In certain exemplary embodiments, the captive member 626 and the positioning member 630 are positioned in parallel or substantially parallel planes to one another. The attachment member 631 couples the captive member 626 to the positioning member 630. In certain exemplary embodiments, the captive member 626, positioning member 630 and the attachment member 631 are integral to one another and formed from a single piece of material. Alternatively, certain of the members 626, 630, and 637 are formed of individual members and coupled to one another using known coupling means including, but not limited to, welding. In the exemplary embodiment depicted in FIG. 6, the member 630 on the socket holder 155 forms a portion of a main body of the socket holder 155, and the member 631 has a substantially curved geometry. For example, the member 631 can have a radius of curvature of approximately 0.1 inch to 0.18 inches, to provide spacing from the housing plane for the length of the fastener 615 and to allow the captive member 626 to collapse as the fastener 615 engages and tightens into the housing end 102*b*, as described below. A person of ordinary skill in the art having the benefit of the present disclosure will recognize that the member 631 can have another radius of curvature in certain alternative exemplary embodiments. For example, the radius of curvature may be related to or proportional to a length of the fastener 615.

Each screw 610 includes a traditional threaded screw, a self-piercing sheet metal screw, or a self-drilling screw, for example. A self-drilling screw includes a "drill bit-style" point 610*a* that, upon positive rotation of the screw 610 relative to an installation surface (such as a ceiling or housing 102), drills its own pilot hole in the installation surface. Thus, the installer simply rotates the screw 610 without first having to drill a pilot hole in the installation surface, reducing time and effort required for installation. At least a portion of the remainder of the screw 610 between the point 610*a* and a head 610*b* of the screw 610 includes threads that engage surfaces in the captive member 626 and positioning member 630. A self-piercing screw is similar to a self-drilling screw, except that, instead of a drill point, it includes a very sharp point that can easily pierce thin metal.

The captive member 626 and positioning member 630 each include an aperture 640 and 641, respectively. The aperture 640 has a diameter slightly larger than the maximum diameter of the drill bit-style point 610*a* or the minor thread diameter portion of the screw 610. The aperture 641 has a diameter or slot larger than the major thread diameter of the screw 610. The end 610*a* of the screw 610 extends through the apertures 640 and 641, out a back side of the socket holder 155 or the door bracket member 605, depending on the location of the screw 610. To install the screw 610 in the bracket subassembly 104, an installer places the end 610 of the screw 610 through at least the aperture 640 and at least a portion of the aperture 641. Then, the installer positively rotates the screw 610 so that at least certain of the threads of the screw engage the member 626, thereby gripping the member 626 to the screw 610. For example, the installer may rotate the screw 610 until the screw head rests on member 626.

Because the diameter of the aperture 640 is less than the head 610*b* of the screw 610 and the threads of the screw 610, the screw 610 is held in place until it needs to be screwed into the wall or other surface. Therefore, once the screw 610 is so installed, the screw 610 is not generally movable absent a deliberate force, which is used to advance the screw 610 for installation purposes. Including such captive hardware can eliminate the risk of dropping or losing hardware before or during the installation process.

In certain exemplary embodiments, the aperture 641 has a diameter that is greater than the threads of the screw 610 but less than the head 610*b* of the screw 610. This allows all of the screw 610, except for the head 610*b*, to pass through the aperture 641 and engage a surface to which the device is being affixed. When the screw 610 advances through the aperture 641, the members 626 and/or 631 flex, with an end of the member 626, which is opposite the member 631, substantially engaging the member 630.

Figure 8:
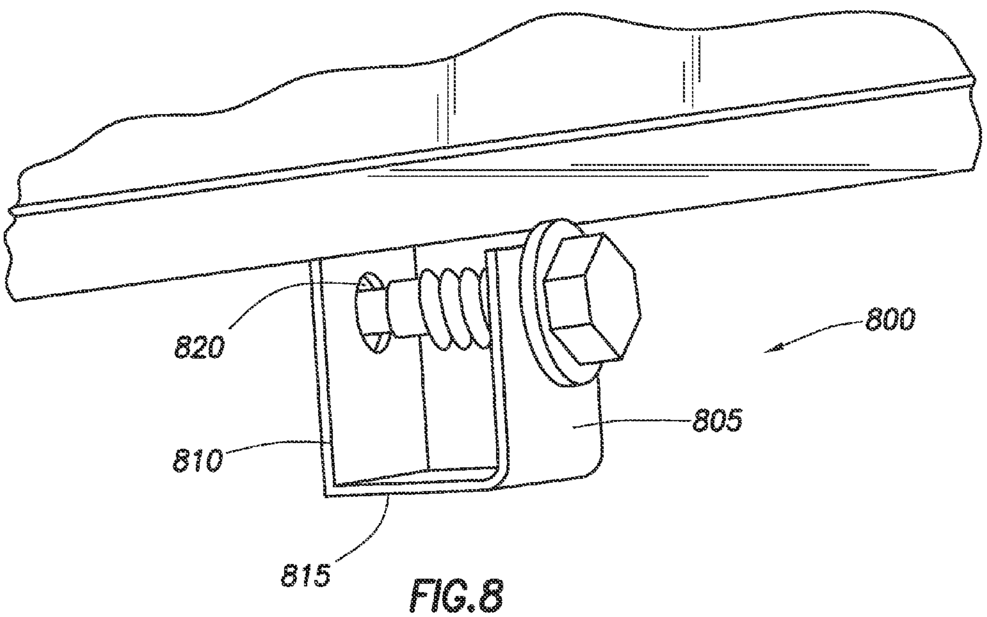
FIG. 8 is a perspective view of a captive hardware configuration, in accordance with a first alternative exemplary embodiment.
Figure 9:
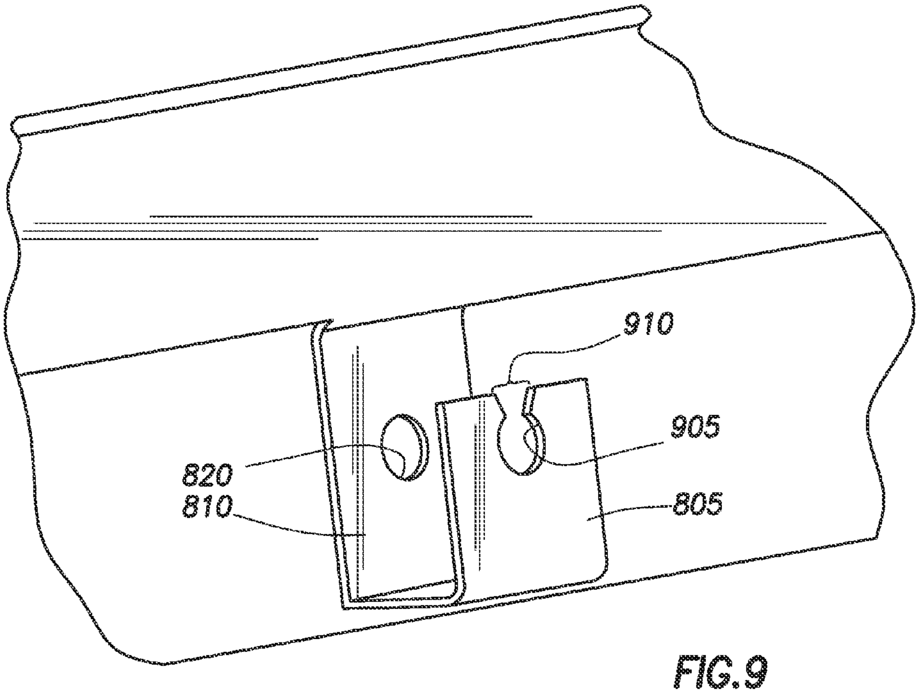
FIG. 9 is a perspective view of the captive hardware configuration of FIG. 8 without the captive hardware.

FIGS. 8-19 illustrate alternative captive hardware fastener configurations, in accordance with certain alternative exemplary embodiments. FIG. 8 is a perspective view of a captive hardware fastener configuration 800, in accordance with a first alternative exemplary embodiment. FIG. 9 is a perspective view of the captive hardware fastener configuration 800 of FIG. 8 without the captive fastener. The configuration 800 is similar to the configuration depicted in FIGS. 6 and 7, except that (a) the attachment member 815 of FIG. 8 is a substantially elongated, substantially straight member instead of a curved member as in FIGS. 6 and 7, and (b) the captive member 805 of the configuration 800 includes a cut-out portion 910 along the circumference of aperture 905 to receive the screw 610 into aperture 905.

Referring to FIGS. 8 and 9, the configuration 800 includes a captive member 805, a positioning member 810, and an attachment member 815. The exemplary captive member 805 and positioning member 810 are positioned in parallel or substantially parallel planes to one-another. The attachment member 815 couples the captive member 805 to the positioning member 810. In certain exemplary embodiments, the captive member 805, positioning member 810 and the attachment member 815 are integral to one another and formed from a single piece of material. Alternatively, the members 805, 810, and 815 are formed of individual members and coupled to one another using known coupling means including, but not limited to, welding.

The captive member 805 includes an aperture 905 with a diameter substantially equal to or slightly less than a maximum diameter of the threaded portion of the screw 610. The captive member 805 also includes the cut-out portion 910 along the circumference of the aperture 905 to receive the screw 610 into the aperture 905. In certain exemplary embodiments, the width of the cut-out portion 910 at the perimeter of the aperture 905 is equal to or just slightly less than the minimum (non-thread) diameter of the screw 610 just below its head so that the threaded portion of the screw 610 slides into or snaps into the aperture 905. Because the diameter of the aperture 905 is less than the head of the screw 610 and either the diameter of the aperture 905 is less than the diameter of the threads of the screw 610 or the threads of the screw 610 engage the member 805, substantially around the aperture 905, the screw 610 is held in place until it is necessary to fasten the screw 610 into a wall or other surface. The positioning member 810 also include an aperture 820 providing a pathway therethrough. The exemplary aperture 820 has a diameter that is greater than the threads of the screw 610 but less than the head of screw 610, to allow all of the screw 610, except for the head, to pass through the aperture 820 and engage the surface to which the device is being affixed.

The screw 610 is held in place along one end, just below the head of the screw 610 by the captive member 805, and the other end of the screw 610 is positioned in the aperture 820 of the positioning member 810, such that minor rotation of the screw 610 about its latitudinal axis will cause the tip of the screw 610 to hit a side of the positioning member 820 (i.e., the tip of the screw 610 is held substantially captive in the aperture 820). However, when the tip of the screw 610 is centered in the middle of the positioning member 820 the tip is substantially flush with a back side of the member 810 to allow for flush mounting of the fixture component to which the screw 610 is coupled (e.g., the socket holder 155 or the door bracket 605) prior to screwing the screw 610 into the desired surface.

Figure 12:
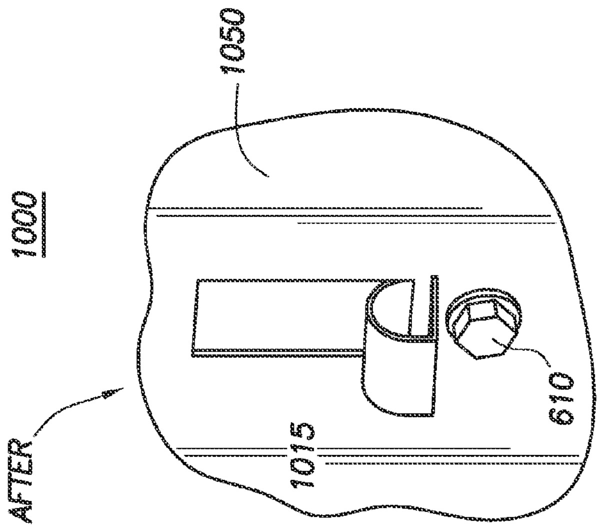
FIG. 12 is a perspective view of the captive hardware feature of FIG. 10 in a third installation stage, in accordance with the second alternative exemplary embodiment.
Figure 11:
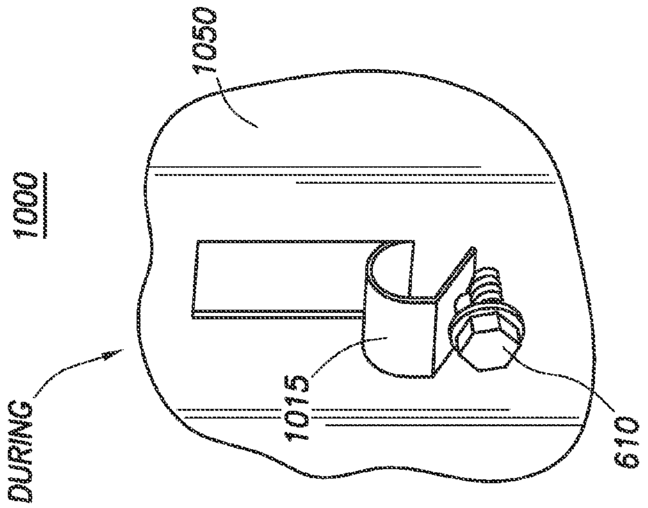
FIG. 11 is a perspective view of the captive hardware feature of FIG. 10 in a second installation stage, in accordance with the second alternative exemplary embodiment.
Figure 10:
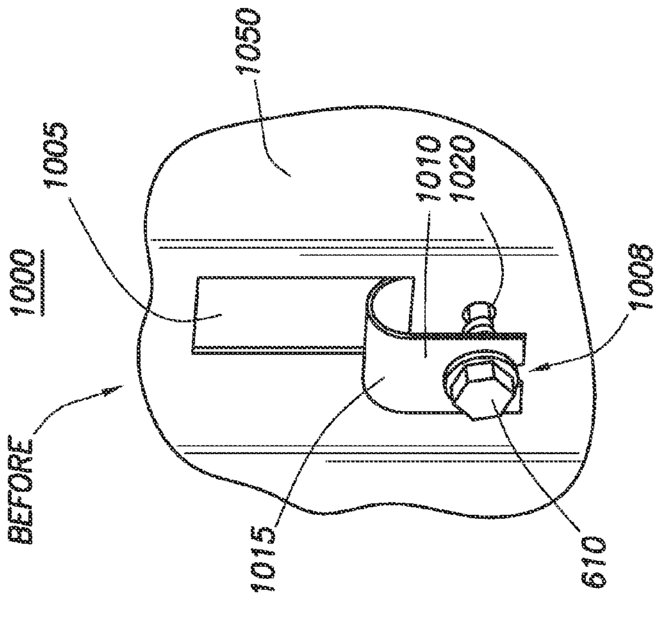
FIG. 10 is a perspective view of a captive hardware feature in a first installation stage, in accordance with a second alternative exemplary embodiment.

FIGS. 10-12 illustrate a captive hardware feature 1000, in accordance with a second alternative exemplary embodiment. FIGS. 10-12 present progressive views of the installation of the screw 610 in the captive hardware feature 1000 into a desired surface. Referring to FIGS. 10-12, in this exemplary embodiment, the captive hardware feature 1000 is formed from a portion of the component 1050 being coupled to the surface. A cut-out 1005 is stamped our of the component 1050, and the captive member 1010 and the attachment member 1015 are formed from the material in the cut-out 1005, with an end of the attachment member 1015 remaining coupled to the component 1050.

In this exemplary embodiment, the attachment member 1015 has a substantially curved shape. Further, in this configuration, the positioning member is actually the component 1050 (or other such member that is being used with the captive hardware feature) itself, such that the wall of the component 1050 (or other member), acting as the positioning member, and the captive member 1010 are aligned in substantially parallel planes. The wall of the component 1050 (or other member) includes an aperture 1020 formed in the side of the component 1050 and providing a pathway therethrough for the screw 610. As with that of the configuration 800 of FIG. 8, the exemplary aperture 1020 has a diameter that is greater than a diameter of the threads of the screw 610 but less than a diameter of the head of the screw 610, to allow the screw 610, except for the head, to pass through the aperture 1020 and engage the desired surface. The captive member 1010 is substantially similar to that described with reference to FIGS. 8 and 9.

In FIG. 10, the screw 610 is starting to progress into the surface to which the component 1050 is being attached. The end of the screw 610 opposite the screw head is entering the surface, and the majority of the screw 610 is disposed outside of the surface, held in place by the surface, the component 1050, and the members 1015 and 1010. The cut-out 1008 (which is similar to cut-out 910 described above) is sized and shaped so that, as the screw 610 advances into the surface, the screw 610 disengages from the captive member 1010. For example, as illustrated in FIG. 11, when the screw 610 has partially advanced into the surface, the screw 610 becomes substantially released from the member 1010, via the cut-out 1008, with a portion of the member 1010 resting on a top surface of the screw 610. As illustrated in FIG. 12, once the screw 610 is fully installed, the screw 610 couples the component 1050 to the surface, with the component 1050 essentially sandwiched between the head of the screw 610 and the surface. The captive member 1010 no longer engages the screw 610 and is bent at an angle relative to its initial position in FIG. 10. In one exemplary embodiment, the captive member 1010 is bent at substantially a perpendicular angle to its initial position.

Figure 13:
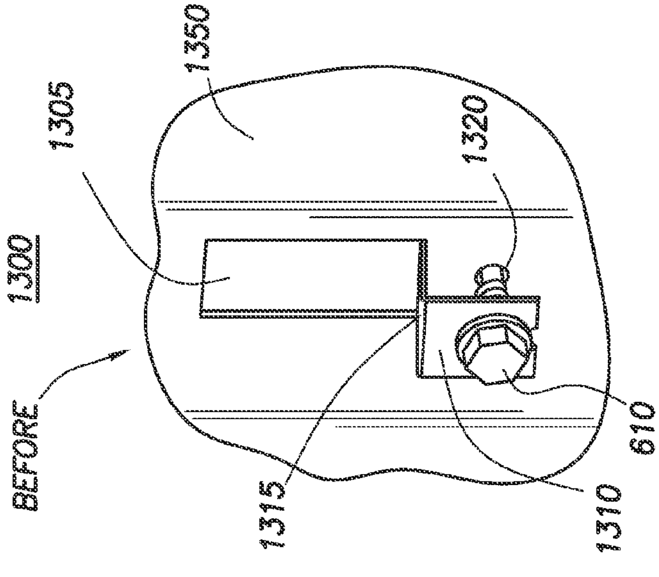
FIG. 13 is a perspective view of a captive hardware feature in a first installation stage, in accordance with a third alternative exemplary embodiment.
Figure 14:
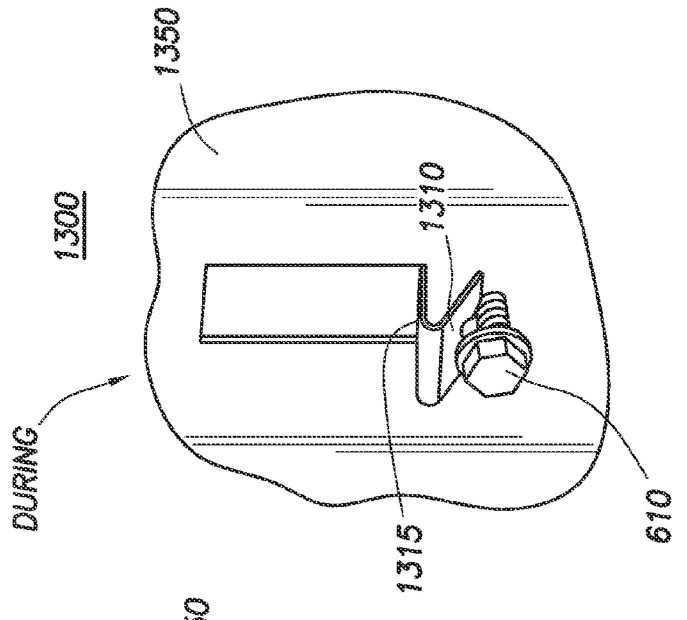
FIG. 14 is a perspective view of the captive hardware feature of FIG. 13 in a second installation stage, in accordance with the third alternative exemplary embodiment.
Figure 15:
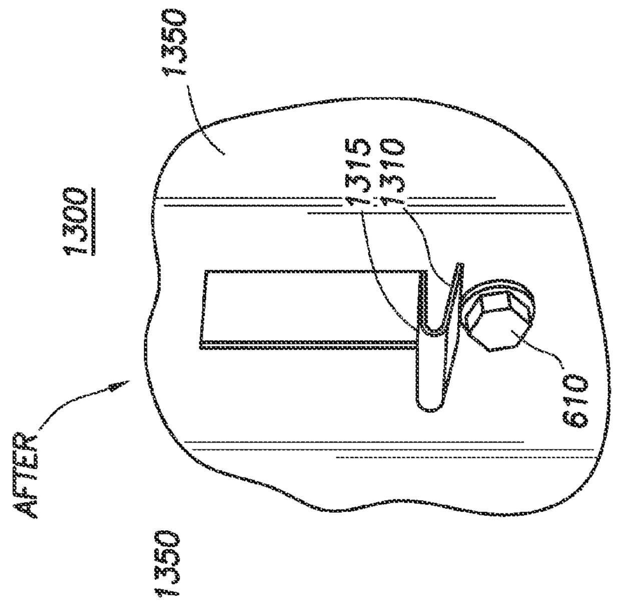
FIG. 15 is a perspective view of the captive hardware feature of FIG. 13 in a third installation stage, in accordance with the third alternative exemplary embodiment.

FIGS. 13-15 illustrate a captive hardware fastener feature 1300, in accordance with a third alternative exemplary embodiment. FIGS. 13-15 present progressive views of the installation of the screw 610 in the captive hardware fastener feature 1300 into a desired surface. Referring to FIGS. 13-15, the feature 1300 is substantially the same as that of FIGS. 10-12, including forming the feature 1300 from a portion of the component 1350 being coupled to the surface, except that the attachment member 1315 is substantially straight and orthogonally positioned with respect to the component 1350 surface and the captive member 1310. FIGS. 14 and 15 present exemplary illustrations of the screw 610 being affixed to the surface and disengaging from the captive member 1310, substantially as described above with respect to FIGS. 11 and 12.

Figure 16:
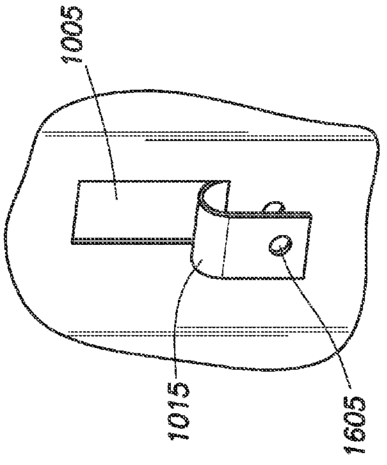
FIG. 16 is a perspective view of a captive hardware feature, in accordance with another alternative exemplary embodiment.

FIG. 16 presents an alternative exemplary embodiment of the captive hardware fastener feature of FIG. 10, without the screw 610 for clarity. In this alternative exemplary embodiment, the member 1020 includes a regular aperture 1605 without a cut-out 1008. As would be recognized by a person of ordinary skill in the art having the benefit of the present disclosure, at least a portion of the screw 610 would be retained within the aperture 1605 after installation.

Figure 17:
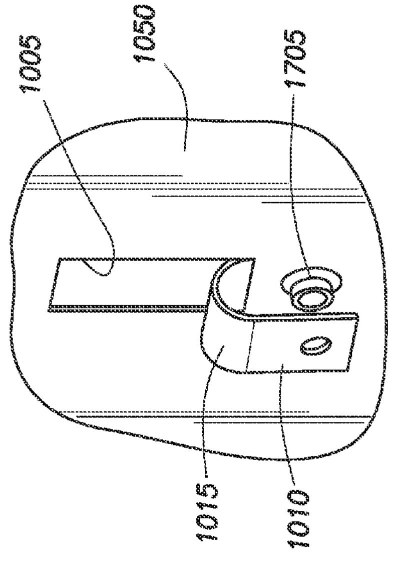
FIG. 17 is a perspective view of a captive hardware feature, in accordance with another alternative exemplary embodiment.
Figure 18:
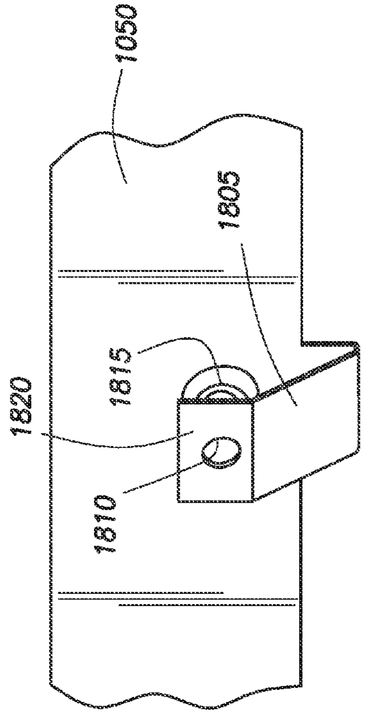
FIG. 18 is a perspective view of a captive hardware feature, in accordance with another alternative exemplary embodiment.
Figure 19:
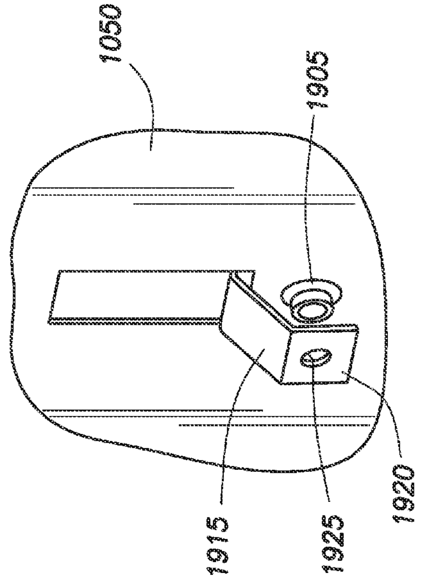
FIG. 19 is a perspective view of a captive hardware feature, in accordance with another alternative exemplary embodiment.

FIGS. 17-19 present additional alternative exemplary embodiments of the captive hardware feature. Included in these alternative embodiments is a beveling or nippling of the aperture 1705, 1815, and 1905 in the component 1050 being installed via the captive hardware feature. By forming this aperture 1705, 1815, and 1905 in such a manner, the depth of the guiding portion of the component 1050 is increased without affecting the opposing side of the component 1050 from mating flat against a desired surface to which the component 1050 is to be affixed. Additionally, the exemplary embodiments of FIGS. 18 and 19 present attachment members 1805 and 1915, respectively, which are disposed at a non-orthogonal angle with respect to the component 1050 and the captive member 1820 or 1920, respectively. Furthermore, while the alternative embodiments of FIGS. 17-19 do not expressly show the cut-out portion along the perimeter of the aperture (1810 and 1925 for example), those of ordinary skill in the art will recognize that the cut-out feature can be added to aid in coupling to the screw to the captive member until the user desires to couple the screw to a desired surface.

Figure 20:
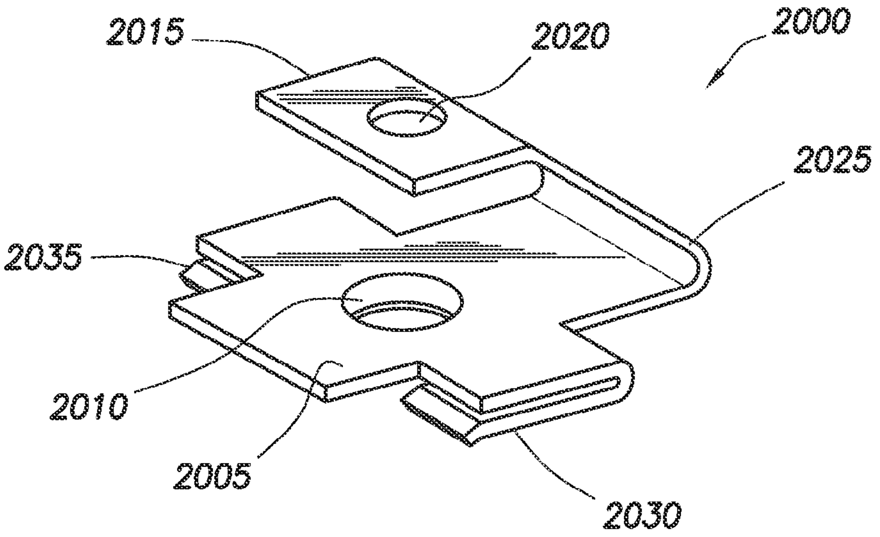
FIG. 20 is a perspective view of a modular retrofit captive hardware feature, in accordance with another alternative exemplary embodiment.
Figure 21:
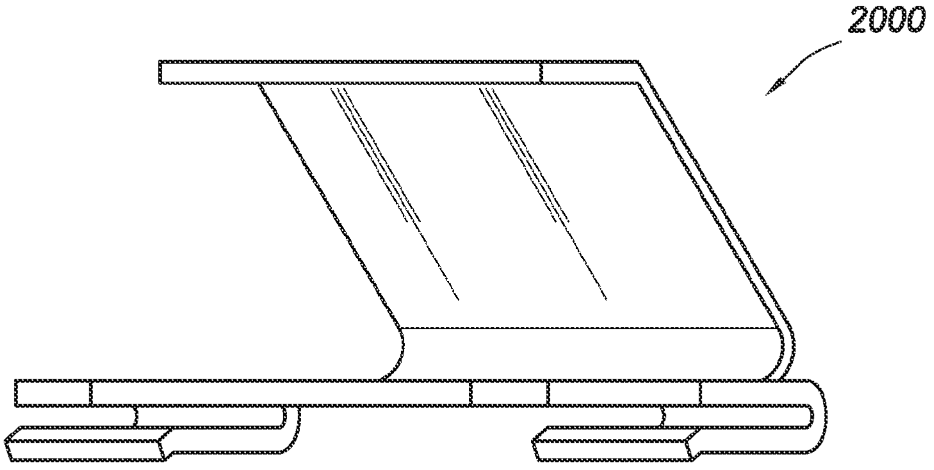
FIG. 21 is a perspective view of the modular retrofit captive hardware feature of FIG. 20, in accordance with another alternative exemplary embodiment.

FIGS. 20 and 21 present a modular captive hardware feature 2000, in accordance with additional alternative exemplary embodiments. In certain exemplary embodiments, the modular feature 2000 is slidably affixed to a component of a light fixture (such as component 1050 described above) by sliding the component between a pair of clips 2030 and 2035 and the positioning member 2005 of the feature 2000 so that the aperture in the component is aligned with the aperture 2010 in the positioning member 2005. Alternative, the modular feature 2000 is slidably affixed to any type of substantially flat component surface. In certain exemplary embodiments, the aperture 2010 has a snap fit and therefore snaps into and extends through at least a portion of the aperture of the component. The remainder of the modular captive hardware feature 2000 is substantially the same as that described above and can be similarly modified to change the shapes and angles of the attachment member 2025 as described above.

In addition, while the captive member 2015 does not expressly show the cut-out portion along the perimeter of the aperture 2020, those of ordinary skill in the art will recognize that the cut-out feature can be added to aid in coupling the screw (not shown) to the captive member 2015 until the user desires to couple the screw to a desired surface. Furthermore, the distance between the clips 2030, 2035 and the positioning member 2005 is capable of being modified to suit the depth of the component to which the feature 2000 is being slidably coupled. One or more of the exemplary modular captive hardware systems 2000 can be included with a retrofit kit to make installation of the components of the kit easier to install.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A method for installing a captive hardware apparatus, comprising the steps of:

providing a captive hardware feature, comprising:

a first member comprising a first aperture, which defines a pathway through the first member;

a second member disposed on a substantially parallel plane as the first member, the second member comprising a second aperture, which defines a pathway through the second member;

a third member coupled at one point to the first member and at a second point to the second member and extending substantially between the first member and the second member;

a fastener extending at least partially through each of the first aperture and the second aperture and held in an initial, substantially fixed position relative to the first member and the second member; and a cut-out feature, which provides a pathway from an edge of the first member to the first aperture, the cut-out feature configured to slidably receive the fastener; and fastening a component to a surface using the captive hardware feature, by moving the fastener from the initial, substantially fixed position to a second position in which a tip of the fastener extends into the surface, the fastener being released from the first aperture, via the cut-out feature, during this moving step.

2. The method of claim 1, wherein a longitudinal plane of the first member rotates about ninety degrees from the initial position to the second position.

3. The method of claim 1, wherein the first member rests on the fastener after the fastener is released from the first aperture.

4. The method of claim 1, wherein the fastener comprises a screw, and wherein the fastening step comprises rotating the screw into the surface.

5. The method of claim 1, wherein at least a portion of the first member is disposed between a head of the screw and a thread of the screw, which is closest to the head.

6. The method of claim 1, wherein the third member comprises a substantially curved member.

7. The method of claim 1, wherein the second member constitutes a portion of a component designed to be affixed to a desired surface via at least the fastener.

8. A captive hardware apparatus, comprising:

a captive hardware feature, comprising:

a first member comprising a first aperture, which defines a pathway through the first member;

a second member disposed on a substantially parallel plane as the first member, the second member comprising a second aperture, which defines a pathway through the second member;

a third member coupled at one point to the first member and at a second point to the second member and extending substantially between the first member and the second member;

a fastener extending at least partially through each of the first aperture and the second aperture and held in an initial, substantially fixed position relative to the first member and the second member; and a cut-out feature, which provides a pathway from an edge of the first member to the first aperture, the cut-out feature configured to slidably receive the fastener, wherein a component is fastened to a surface using the captive hardware feature by moving the fastener from the initial, substantially fixed position to a second position in which a tip of the fastener extends into the surface, the fastener being released from the first aperture via the cut-out feature.

9. The captive hardware apparatus of claim 8, wherein a longitudinal plane of the first member rotates about ninety degrees from the initial position to the second position.

10. The captive hardware apparatus of claim 8, wherein the first member rests on the fastener after the fastener is released from the first aperture.

11. The captive hardware apparatus of claim 8, wherein the fastener comprises a screw.

12. The captive hardware apparatus of claim 11, wherein at least a portion of the first member is disposed between a head of the screw and a thread of the screw, which is furthest from a tip of the screw, the tip disposed opposite the head.

13. The captive hardware apparatus of claim 8, wherein the third member comprises a substantially curved member.

14. The captive hardware apparatus of claim 8, wherein the second member constitutes a portion of a component designed to be affixed to a desired surface via at least the fastener.

* * * * *